(12) United States Patent
Turan

(10) Patent No.: US 10,208,864 B1
(45) Date of Patent: Feb. 19, 2019

(54) THROUGH-HOLE PLUG

(71) Applicant: William Turan, Pompano Beach, FL (US)

(72) Inventor: William Turan, Pompano Beach, FL (US)

( * ) Notice: Subject to any disclaimer, the term of this patent is extended or adjusted under 35 U.S.C. 154(b) by 0 days.

(21) Appl. No.: 16/021,743

(22) Filed: Jun. 28, 2018

(51) Int. Cl.
*F16K 5/18* (2006.01)
*B63B 13/02* (2006.01)
*F16K 5/04* (2006.01)
*F16K 24/02* (2006.01)
*B63B 13/00* (2006.01)

(52) U.S. Cl.
CPC .............. *F16K 5/185* (2013.01); *B63B 13/02* (2013.01); *F16K 5/0407* (2013.01); *F16K 5/0478* (2013.01); *F16K 5/0492* (2013.01); *F16K 24/02* (2013.01); *B63B 13/00* (2013.01)

(58) Field of Classification Search
CPC ................................ B63B 13/00; B63B 13/02
USPC ......................................................... 114/197
See application file for complete search history.

(56) References Cited

U.S. PATENT DOCUMENTS

| 847,112 | A | | 3/1907 | Renton | |
|---|---|---|---|---|---|
| 2,367,718 | A | | 1/1945 | Farrell | |
| 3,394,671 | A | | 7/1968 | Mayer | |
| 3,797,442 | A | * | 3/1974 | McRae | B63B 13/02 |
| | | | | | 114/197 |
| 3,812,810 | A | * | 5/1974 | Moeller | B63B 13/00 |
| | | | | | 114/197 |
| 5,460,111 | A | | 10/1995 | Frahn | |
| 5,598,806 | A | | 2/1997 | Stivers | |
| 6,227,132 | B1 | | 5/2001 | Garcia | |
| 6,625,760 | B1 | | 9/2003 | Wise et al. | |
| 6,634,312 | B2 | | 10/2003 | Warner et al. | |
| 6,928,943 | B1 | | 8/2005 | Neubauer | |
| 6,973,891 | B1 | | 12/2005 | Warner | |
| 7,152,546 | B2 | | 12/2006 | Bernath | |
| 7,434,528 | B1 | | 10/2008 | McKibben | |
| 7,699,012 | B2 | * | 4/2010 | Cotten | B63B 13/00 |
| | | | | | 114/197 |

(Continued)

OTHER PUBLICATIONS eBay website https://www.ebay.com/bhp/boat-drain-plug Cabela's. https://www.cabelas.com/product/Attwood-Drain-Plugs/737484.uts?productVariantId=1185046&WT.tsrc=PPC&WT.mc_id=GoogleProductAds&WT.z_mc_id1=00931526&rid=20&ds_rl=1252079&gclid=EAlaIQobChMIr-q93MnC2wIVBwhpCh2nfA8eEAQYASABEgLgZfD_BwE&gclsrc=aw.ds.

*Primary Examiner* — Lars A Olson
(74) *Attorney, Agent, or Firm* — Jacqueline Tadros; Jacqueline Tadros, P.A.

(57) ABSTRACT

A through hole plug having a body configured to fit snugly within a drain hole for sealing engagement therewith. The body includes a corrugated surface formed of a plurality of annular ribs, wherein the plurality of annular ribs form concentric rings of substantially equal radii that extend around a circumference of the body and along the length of the body. The body further comprises a bore positioned in a center of the body, the bore extending continuously within the center of the body along the length of the body. The through hole plug includes a threaded bolt positioned within the bore. The bolt includes a top end having a handle for maneuvering the bolt in a clockwise or counterclockwise direction while inserted within the bore. The threaded bottom portion of the bolt extends beyond the length of the body and fastens to an annular flange, the annular flange having a threaded aperture sized to receive and mate with the threaded bottom portion of the bolt.

18 Claims, 5 Drawing Sheets

(56) References Cited

U.S. PATENT DOCUMENTS

| | | |
|---|---|---|
| 8,256,365 B2 | 9/2012 | Wise et al. |
| 9,371,112 B2 | 6/2016 | Sarnowski et al. |
| 2009/0050043 A1 | 2/2009 | Alvarez |
| 2011/0259255 A1 | 10/2011 | Pitts et al. |

* cited by examiner

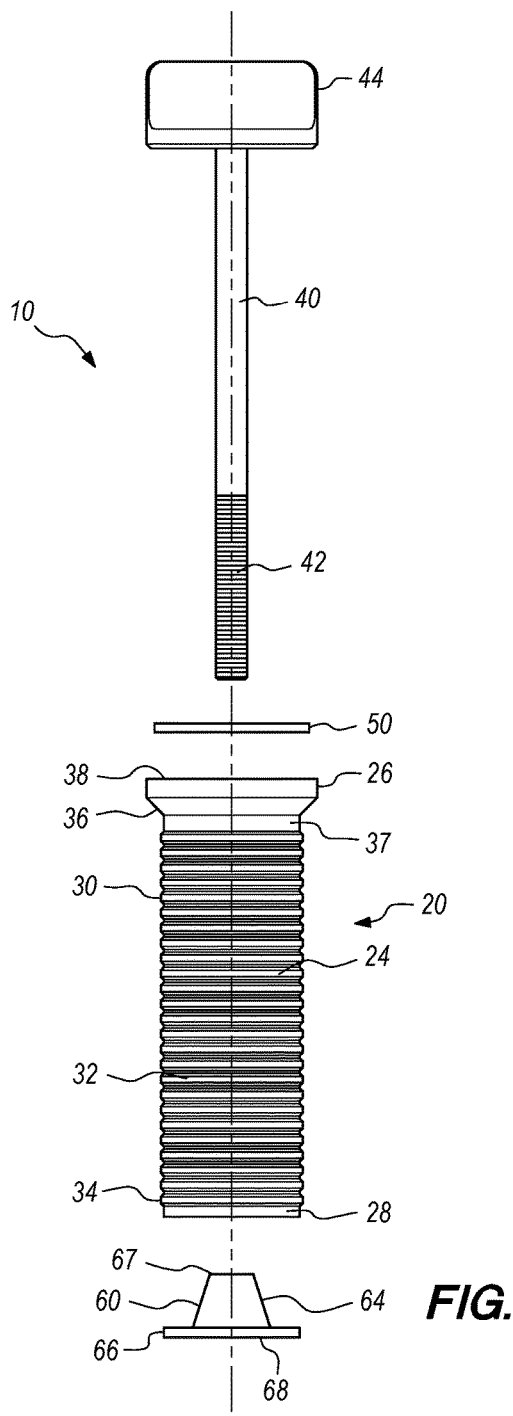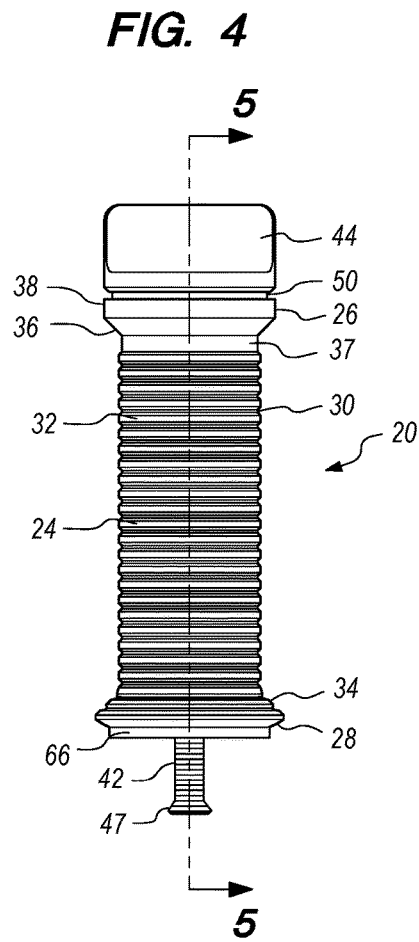

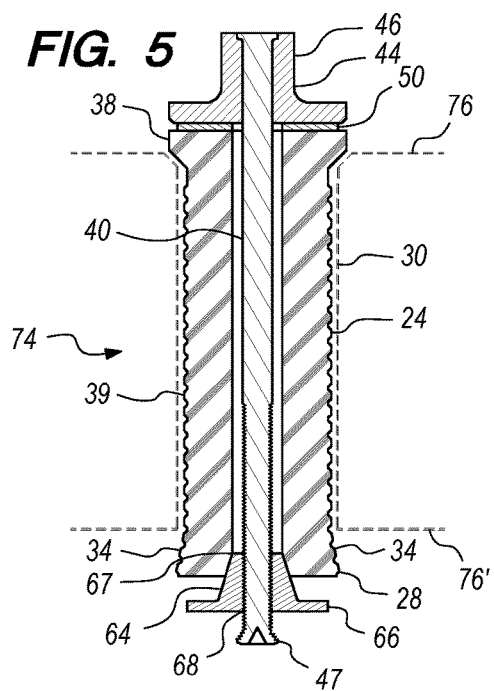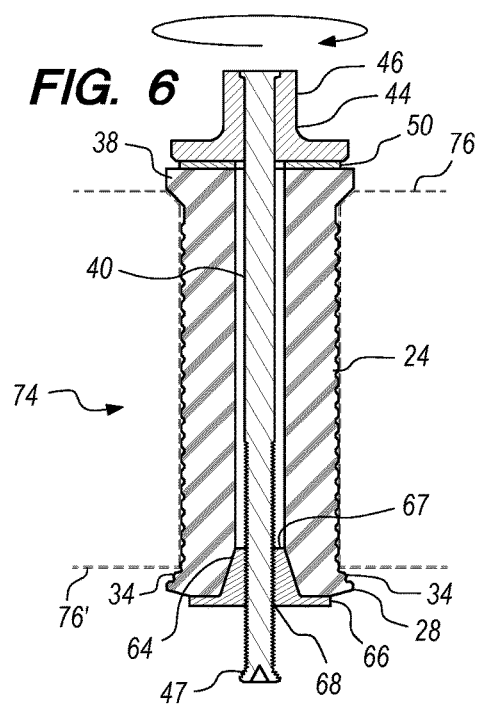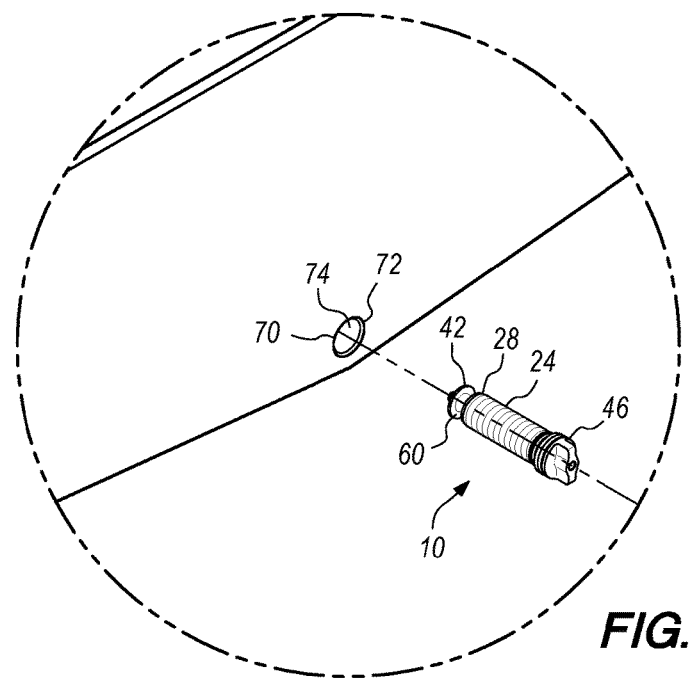

THROUGH-HOLE PLUG

BACKGROUND OF THE INVENTION

1. Field of the Invention

The present disclosure relates generally to a through hole plug. More particularly, the invention relates to a through-plug for sealing a drain hole passing through the hull of a boat. The boat through-hole plug is inserted into the drain hole for sealing engagement therewith.

2. Description of the Related Art

Water often accumulates at the bottom of smaller boats. Thus, boats of twenty-five feet or under in length, typically include a drain hole for draining water that accumulates within the boat. Boat plugs for sealing the drain hole of a boat are known in the art, but are disadvantageous in many respects.

Boat plugs known in the art include U.S. Pat. No. 6,615,760 B1 (to Wise et al.) for a boat drain plug that is mounted in a hole passing through the transom of a boat. The boat plug of Wise et al. includes a ball valve assembly, including a sealing ball and a flow through ball seal component that are held within the drain hole by a retaining ring.

The prior art also teaches U.S. Pub. No. 2011/0259255 A1 (to Pitts et al.) for a tamper proof boat drain plug. The boat plug of Pitts et al. includes external threads that mate with a boat hole housing and an end keyed to operate the plug, wherein the key may include a first end portion that mates with the plug and a second end portion that mates with a driver.

U.S. Pat. No. 5,460,111 to Frahn discusses a boat transom drain hole plug, to seal the hole in a boat's transom. The plug provides a flexible rubber stopper having an axial channel that is inserted into the transom hole. A plug bolt and nut are threadably engaged inside the rubber stopper. A flexible spring rod is attached to the plug bolt and may be used to rotate the plug bolt.

One of the primary disadvantages of boat plugs known in the art is slippage between the stopper and fastener. That is, the seal provided by the plugs is often compromised and therefore plugs may be inadvertently dislodged. Dislodgement or loss of the plug may occur while the boat is docked, in which case the boat is at risk of sinking. Plugs may also be dislodged while the boat is in use in the water, with possible calamitous consequences.

In the context of a boat plugs for drain holes it is desirable to have a reliable device that is relatively inexpensive, effectively seals the drain hole, is easy to mount and remove and may further be disassembled or assembled with relative ease.

SUMMARY OF THE INVENTION

In accordance with the present invention, a boat through-hole plug of the invention is disclosed. In one embodiment, the invention teaches a plug having a rubber body preferably formed of a single injection mold and a central bore of uniform diameter passing through the center of the body. A first end of the body includes a diameter that exceeds the diameter of the boat's drain hole such that it cannot pass through the boat's drain hole. The diameter of the main body is less than that of the boat's drain hole. The diameter of the main body should allow for a smooth insertion into the boat's drain hole, but should also ensure that the gap between the main body and the boat's drain hole is such that it will allow the through hole plug to effectively plug the boat's drain hole when in operative use. The length of the body is such that it is greater than the length of the boat's drain hole.

The invention provides a bolt to be inserted through the center of the body. The bolt is preferably made of metal but may also be plastic or another suitable material. The diameter of the bolt should be slightly less than the diameter of the bore, so that the gap therebetween allows for the bolt to be easily inserted and removed from the central bore of the body. In a preferred embodiment the gap is between one eight and one quarter of an inch in diameter. The length of the bolt is greater than the length of the body, which in turn is greater than the length of the boat's drain hole.

One end of the bolt includes a handle for maneuvering the bolt and turning the bolt clockwise and counterclockwise. A second end of the bolt, opposite to and most distal to the handle is threaded.

In one embodiment, the boat through-hole plug of the invention includes an flared nut with annular flange having an aperture with a threaded interior for mating engagement with a threaded segment of the bolt. In this embodiment, the length of the bolt exceeds the sum of the length of the body and the length of the annular flange. Once the bottom of the bolt is threaded through the flared nut with annular flange, an end of the bolt is flattened such that the diameter of the flattened end of the bolt exceeds the diameter of the aperture at an end plate of the flared nut with annular flange for ease of use and for further securing the annular flange to the bolt.

The flared nut with annular flange includes a tapered neck wherein a first end of the tapered neck is dimensioned for insertion into the bore of the body. The diameter of an aperture at the first end of the tapered neck is substantially equal to the diameter of the central bore of the body.

Increasingly, fastening the bolt to the threaded flared nut with annular flange causes the entire tapered neck to be pushed into the bore, such that the tapered neck of the flange is completely secured within the bore positioned at a second end of the body.

As the tapered neck is inserted into the bore at the second end of the body, the length of the main body is compressed and the insertion of the tapered neck causes the second end of the body proximate to the tapered neck of the flange to bulge outward, such that the diameter of body at the second end proximate to the tapered neck, exceeds the diameter of the boat's drain hole. The main body of the through-hole plug is therefore secured within the boat's drain hole while the first end and second end of the body, having diameters that exceed the diameter of the boat's drain hole, are on either end of the length of the boat's drain hole. Thus the boat through-hole plug forms a resilient impenetrable seal therewith the boat's drain hole and cannot be accidentally removed.

An aspect of the invention is that it easily and readily allows a user to removably affix a boat through-hole plug in the hull of a boat.

An object of the boat through-hole plug of the invention is that it is secure and provides a boat through-hole plug that will not accidentally be knocked out or removed.

An advantage of the boat through-hole plug of the invention is that it improves boat-through hole plugs known in the art prone to slippage or inadvertent removal and prevents dislodgment.

Another advantage of the boat through-hole plug of the invention is that it is safe economical and easy to use.

These and other aspects and advantages of the present disclosure will become apparent from the following detailed description of preferred embodiments of the invention considered in conjunction with the accompanying drawings, in which like drawings represent like components. It is to be understood, however, that the drawings are designed solely for purposes of illustration and not as a definition of the limits of the disclosure, for which reference should be made to the appended claims. Moreover, the drawings are not necessarily drawn to scale and that, unless otherwise indicated, they are merely intended to conceptually illustrate the structures and procedures described herein.

BRIEF DESCRIPTION OF THE INVENTION

FIG. 3 is a front exploded view of the boat through-hole plug of the present invention.

FIG. 4 is a front view of the boat through-hole plug of the present invention.

FIG. 5 is a cross sectional view of FIG. 4 of the boat through-hole plug of the present invention, illustrating the plug inserted through the hull of a boat drain hole with the annular flange inserted midway into the body.

FIG. 6 is a cross sectional view taken along line 5-5 of FIG. 4 of the boat through-hole plug of the present invention, illustrating the plug inserted through the hull of a boat drain hole with the annular flange fully inserted.

FIG. 7 is a of the boat through-hole plug of the present invention ready for insertion through the hull of a boat's drain hole.

DETAILED DESCRIPTION OF THE PREFERRED EMBODIMENTS

Figure 1:
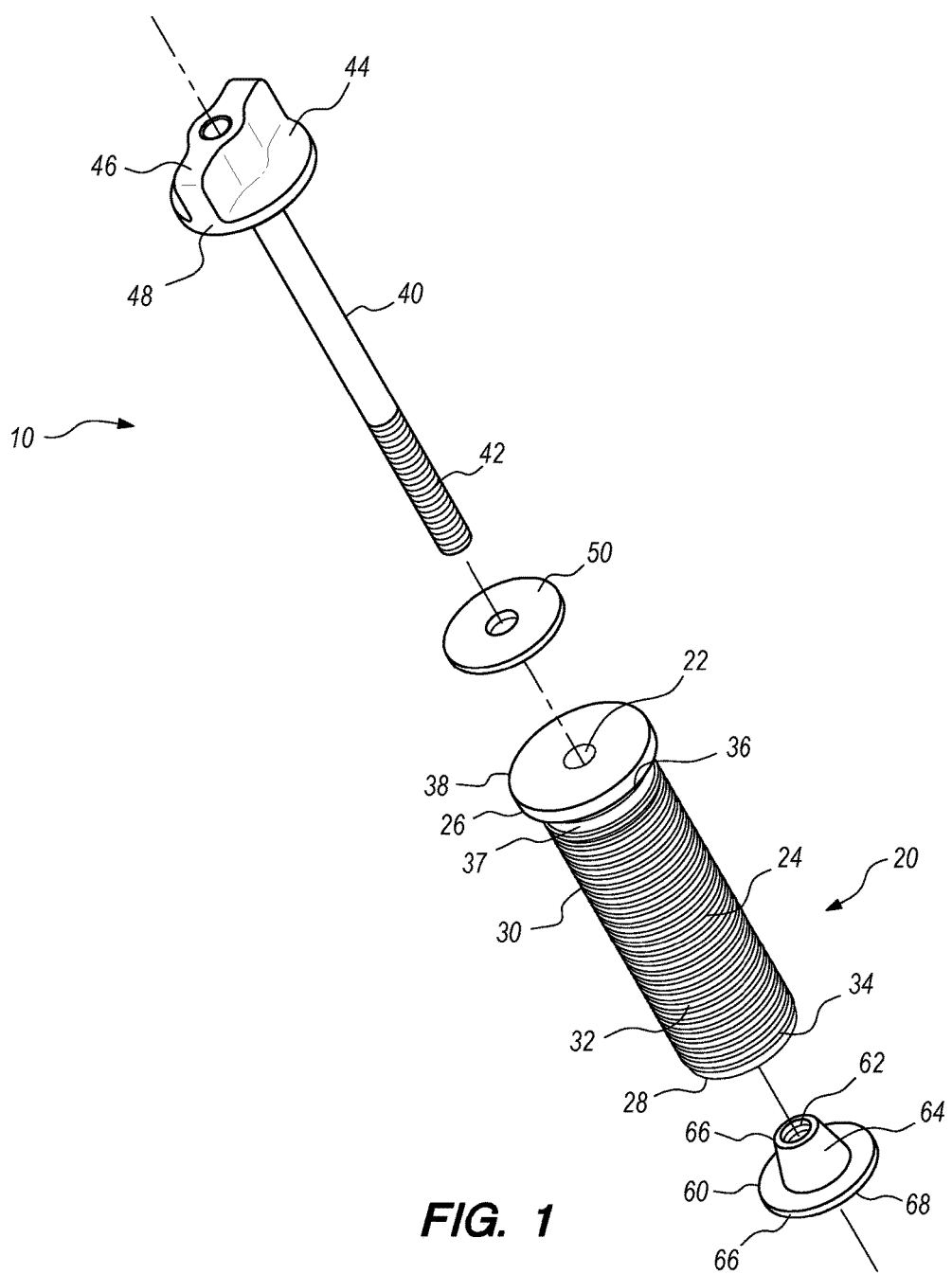
FIG. 1 is a perspective exploded view of the boat through-hole plug of the present invention.

Referring now to FIGS. 1-8B, there are shown illustrations of a boat through-hole plug 10 of the invention. Although in the context of the invention, the boat through-hole plug 10 is illustrated for use with boats in particular, it is appreciated that the through-hole plug of the invention may be used with structures other than boats. The boat through-hole plug 10 of the invention includes a body 24, a bolt 40, a washer 50 and a flared nut including an annular flange 60.

The body 20 a main body 24, a first end 26 and a second end 28. The body further includes a cylindrical bore 22 having a diameter D2 positioned in a center of the body 20. The bore extends continuously within the center of the body 20 along a length L1 of the body 20 from the first end 26 of the body 20 to the second end 28 of the body 20.

In a preferred embodiment, the body 20 is a single unitary structure formed of a solid rigid rubber material formed by single injection molding. The main body 24 includes a corrugated surface 30 of annular ribs 32. Preferably the annular ribs 32 each extend in continuous rings around the circumference of the main body 24 and along the length L1 of the main body 24. The ribs 32 form concentric rings of substantially equal radii around the exterior of the body 24 and along the length L1 of the main body 24. In a preferred embodiment, the width of the annular ribs 32 ranges from one eight to one quarter inch and the space between each of the annular ribs 32 ranges from one eight to one quarter inch.

The main body 24 is configured and dimensioned to fit within a boat's drain hole 70 such that there is a gap 39 between the main body 24 and the interior walls of the drain hole 74. The gap 39 between the main body 24 and drain hole 70 is extinguished when the through-hole plug 10 is in operative use. Typically a boat's drain hole 70 is circular. Accordingly, in a preferred embodiment, the main body 24 is cylindrical and tubular. It is appreciated by one reasonably skilled in the art that if the boat's drain hole 70 is of a different geometric shape or size, the shape and size of the main body 24 may be altered to accommodate the boat's drain hole 70 and to fit snugly therein.

The length L1 of the body 20 is greater than a length L4 of the boat's drain hole 70 such that the first end 26 and second end 28 of the body 20 each extend beyond the length L4 of the boat drain hole 70 on either side of the drain hole 70. It is appreciated that different boats may include boat drain holes 70 of varying lengths. Accordingly, the through-hole plug 10 may be manufactured in different sizes suitable for drain holes 70 of varying lengths, to ensure that in each instance the length L1 of the body 20 is greater than the length L4 of the boat's drain hole 70.

The bolt 40 has a diameter D4 that is slightly less than the diameter D2 of the bore 22 such that the bolt may be slidably inserted and removed from the bore 22. Preferably there is a minimum gap space to allow the bolt to be easily inserted and removed while also providing a snug fit when the bolt 40 is inserted into the bore 20. The bolt 40 is preferably comprised of a metal, such as for example brass or steel or other metal. Preferably a gap of one eight to one sixteenth inches exists between the bolt 40 and the body 20 when the bolt is inserted in the bore 22. The bolt 40 may also be comprised of plastic, or any other suitable material, as will be appreciated by one reasonably skilled in the art. The bolt 40 includes a length L3 that is greater than the length L2 of the body 20, such that a bottom portion 42 of the bolt 40 extends beyond the length L1 of the body 20 when the bolt 40 is fully inserted into the bore 22 of the body 20. The cylindrical bore 22 preferably includes a smooth interior 34 to facilitate insertion and removal of the bolt 40 therein.

In one embodiment, the length of the bolt L3 exceeds the combined length L2 of the body 20 and a length L5 of the flared nut with annular flange 60. When the boat through-hole plug 10 is assembled, the bolt 44 is inserted through the body 20 and flared nut with annular flange 60 and a bottom tip 47 of the bolt 44 is pinched to deform thereby creating a mushroomed formation to secure the boat through-hole plug 10 as a single unit and prevent the flared nut with annular flange 60 from unthreading or slipping off.

The first end 26 of the body 20 has a diameter D3 that is larger than a diameter D1 of the main body 24 and of the second end 28, and larger than a diameter D5 of the boat's drain hole 70. The first end 26 is positioned outside of the boat's drain hole 70 when the boat through-hole plug 10 is inserted into the drain hole 70. The first end 26 of the body extends beyond the boat's drain hole 70 and is configured to sealingly mate with a rim 72 of the boat's drain hole 70. The first end 26 of the body 20 includes a neck 36. The neck 36 is configured to transition within a rim 72 of the boat's drain hole 70 for mating engagement therewith. In a preferred embodiment, the neck 36 includes a smooth slope 37. A top portion of the first end 26 includes a generally flat planar surface 38. The first end 26 of the body 20 extends beyond the rim 72 of the boat's drain hole 70.

In one embodiment, a bottom portion 42 of the bolt 40 is threaded. In a preferred embodiment, the bottom third to bottom half portion 42 of the bolt 42 is threaded. A handle 44 is positioned on a top portion of the bolt 40 most distal to the bottom portion 42. In one embodiment the bolt 40 and the handle 44 are combined in a single unitary structure.

The handle 44 preferably includes an ergonomic bar 46 to allow a user to maneuver the bolt 40 and comfortably turn the bolt 40 in a clockwise or counter clockwise direction in order to fasten or unfasten the threaded portion 42 of the bolt 40 to the threaded flared nut with annular flange 60. The handle 44 includes a substantially annular flat disk 48. In one embodiment, the disk 48 has a diameter D6 substantially equal to the diameter D3 of the first end 26 such that when the bolt 40 is inserted into the bore 22, the annular flat disk 48 of the handle 44 is aligned and flush with the first end 26 of the body 20.

In a preferred embodiment a washer 50 rests between the flat planar surface 38 of the first end 26 of the body 20 and a bottom side of the annular flat disk 48 of the handle 44 when the bolt 40 is inserted into the bore 22. The washer 50 may be fabricated from a nickel silver metal or another suitable material as will be appreciated by one reasonably skilled in the art.

The flared nut with annular flange 60 includes a threaded aperture 62 sized to receive and mate with the threaded bottom portion 42 of the bolt 40. The flared nut with annular flange 60 includes a conical tapered neck 64 and a disk shaped plate 66. The conical tapered neck 64 is narrowest at a first end 67 most distal to the disk shaped plate 66. The conical tapered neck 64 widens progressively from the first end 64 to the second end 68 most proximate to the plate 66. The threaded aperture 62 extends all through the annular flange 60 from the tapered neck 64 to the disk shaped plate 66. The first end 67 of the tapered neck 64 is sized to matingly engage with the bore 22 of the body 20, such that when the threaded aperture 62 of the flared nut with annular flange 60 is fastened to the threaded bottom portion 42 of the bolt 40, the tapered neck 64 is inserted into the bore 22 thereby compressing the main body 24 such that the corrugated surface 30 of the main body 24 completely fills the drain hole, thereby pushing against the interior 74 of the drain hole 70. The full insertion of the flared nut with annular flange 60 into the bore 22 further compresses the second end 28 of the body 20 thereby bulging the second end 28 and a bottom portion 34 of the main body 24 to form a mushroom shape such that a diameter D7 of the compressed second end 28 is greater than the diameter D5 of the drain hole 70.

The full insertion of the tapered neck 64 of the flared nut 60 within the bore 22 of the body 20 forms an impenetrable, resilient and durable seal. Additionally, the rubber material of the center of the body 24 grips and compresses around the tapered neck 64 and forms a resilient seal therewith. The interaction of the rubber and the metal of the tapered neck 24 creates a static friction and the bonding therebetween forms a strong secure seal. The bolt 22 may be removed by turning the wing nut 44 counter clockwise thereby releasing the seal.

In a preferred embodiment, the first end 67 of the tapered neck 64 most distal to the disk shaped plate 66 includes a diameter D8 that is substantially the same as the diameter D2 of the bore 22 such that the first end 67 of the tapered neck 64 may be inserted and pushed into the bore 22 with relative ease. As the handle 44 is rotated clockwise, the threaded portion of the bolt 42 engages the threaded aperture 62 of the flared nut with annular flange 60 until the entire tapered neck 64 is pushed into and inserted within the bore 22 and the disk shaped plate 66 rests against a bottom side of the second end of the body 28. When the annular flange 60 is fully inserted in the bore 22, a segment of the bottom portion 42 of the bolt 40 extends beyond the aperture 62 of the flange 60. The configuration of the flared nut 60 and conical tapered neck 64 force the bottom portion 34 of the main body 24, positioned on a second side of the hull 76' outside of the drain hole 70, to expand in width thereby increasing the diameter D1 of the bottom portion 34 and second end 28 of the main body 24, such that it exceeds the diameter D5 of the drain hole 70, thereby forming an effective seal on a first side of the hull 76 outside of the drain hole, on the second side of the hull 76' outside the drain hole, and within the interior of the drain hole 70.

Figure 2:
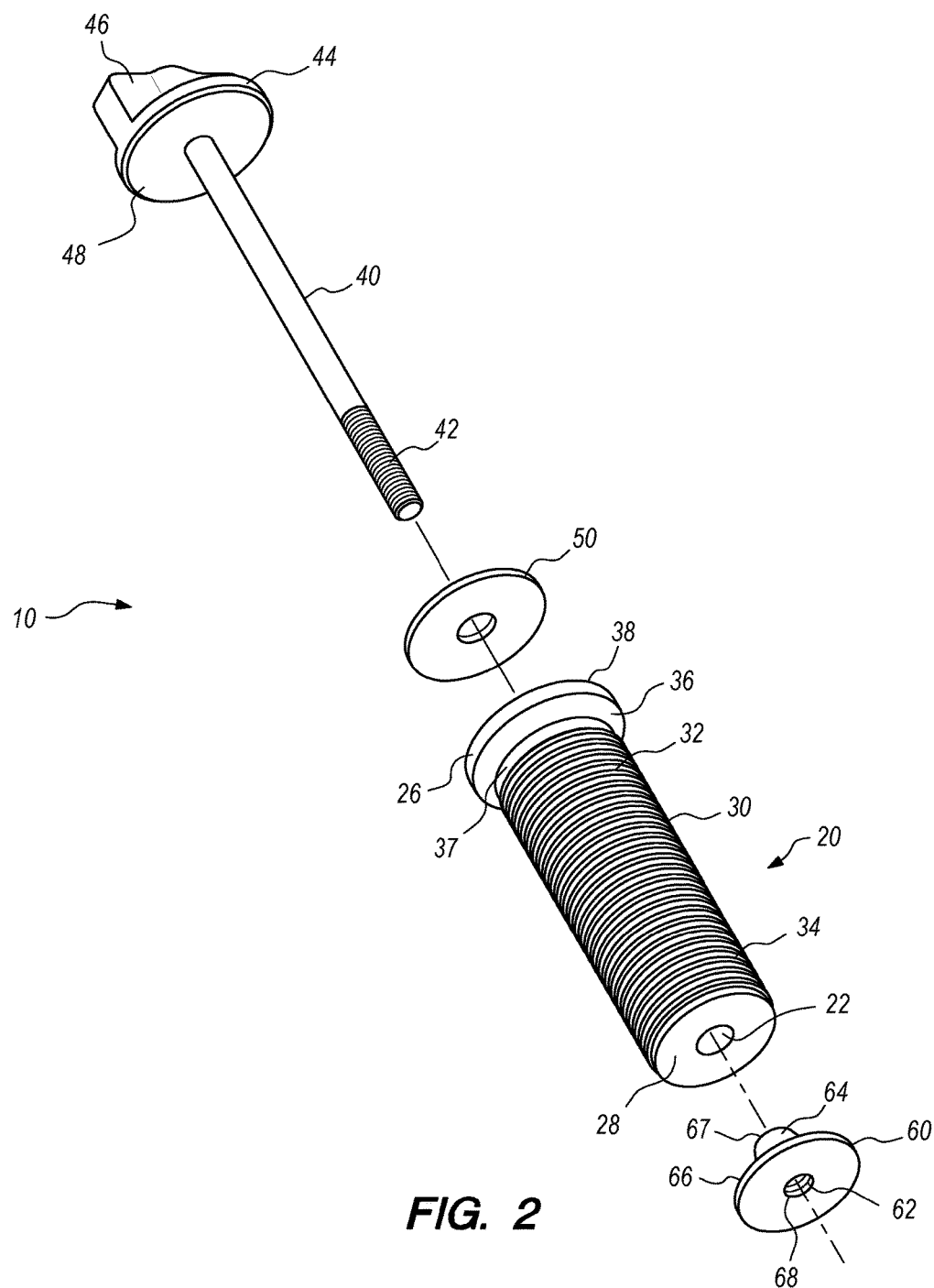
FIG. 2 is another perspective exploded view of the boat through-hole plug of the present invention.

Referring in particular to FIGS. 1-2 there is shown a perspective exploded view of the boat through-hole plug 10. There is shown the body 20 including the main body 24, the first end 26 and the second end 28. The first end 28 including the flat planar surface 38 and the neck 36. The diameter D3 of the first end 28 is larger than the diameter D5 of the drain hole 70 (not shown in FIGS. 1-2). The main body 24 has a diameter D1 and a corrugated surface 30 including a plurality of annular ribs 32 forming concentric rings of equal radii. The body 20 includes the central bore 22 having a uniform diameter D2. It is noted that the diameter D1 of the main body 24 is less than the diameter D5 of the drain hole 70 (not shown in FIGS. 1-2).

There is shown the flared nut with annular flange 60 including the threaded aperture 62 sized to receive and mate with the threaded bottom portion 42 of the bolt 40. There is shown the conical tapered neck 64 and the disk shaped plate 66. The conical tapered neck 64 is narrowest at the first end 67 most distal to the disk shaped plate 66. The conical tapered neck 64 widens progressively from the first end 67 to the second end 68 most proximate to the plate 66.

The threaded aperture 62 extends all through the annular flange 60 from the first end 67 to the disk shaped plate 66. The diameter of the first end 67 sized to matingly engage with the bore 22 of the body 20, such that when the threaded aperture 62 is fastened to the threaded bottom portion 42 of the bolt 40, the tapered neck 64 is inserted into the bore 22. In a preferred embodiment a diameter D8 of the first end 67 is equal to the diameter D2 of the bore 22.

The bolt 40 is shown with the handle 44 and the bottom threaded portion 42. The diameter D4 is slightly less than the diameter D2 of the bore 22 such that the bolt may be slidably inserted and removed from the bore 22 and the washer 50.

FIG. 3 is a front exploded view of the boat through-hole plug 10 showing the component parts, including the bolt 40, the washer 50, the body 20, including the main body 24, and the first end 26 and the second end 28.

FIG. 4 is a front view of the fully assembled boat through-hole plug 10 showing the bolt 40 fastened to the flared nut with annular flange 60 fully inserted within the bore 22 of the body 20. There is shown the bottom tip 47 of the bolt 44 pinched to deform thereby creating a mushroomed formation to further secure the boat through-hole plug 10 as a single unit and prevent the flared nut with annular flange 60 from unthreading or slipping off prior to it's insertion into the drain hole 70 and prior to it's insertion into the bore 22.

FIG. 5 is a cross sectional view of the assembled boat through-hole plug 10, illustrating the plug 10 inserted through the hull 76 of a boat drain hole 70 with the flared nut with annular flange 60 inserted midway. The length L2 of the body 20 is greater than the length L4 of the drain hole 70 such that the first end 26 of the body 20 is positioned on the first side of the hull 76 outside of the drain hole 70 and the second end 28 of the body 20 is positioned on the second side of the hull 76' outside of the drain hole 70. As shown in FIG. 5, with the flared nut with annular flange 60, inserted midway into the bore 22, the main body 24 compresses lengthwise, thereby shortening lengths L1 and L2, while simultaneously increasing the diameter D1 of the main body. The insertion of the flared nut with annular flange 60 causes the second end 28 to bulge outwards thereby creating a mushroom effect resulting in the diameter of the second end 28 to increase from D1 in an unexpanded state to D7 in the expanded state (as shown in FIG. 6).

FIG. 6 is a cross sectional view taken along line 5-5 of FIG. 4 of the boat through-hole plug of the present invention, illustrating the plug 10 inserted through the boat's drain hole 70 with the flared nut with annular 60 flange fully inserted in the bore 22. The first end 26 and second end 28 of the body are positioned respectively on the first side of the hull 76 and second side of the hull 76'. As shown, the diameter D7 of the second end 28 when the flared nut of the annular flange 60 is fully inserted into the bore 22 is substantially equal to the diameter D3 of the first end 26. As shown, the diameter D1 of the body expands thereby pushing the corrugated surface 30 of the main body 24 against the interior walls of the drain hole 70 and completely filling the drain hole 70. The diameter D1 of the second end 28 expands to a diameter D7 that exceeds the diameter D5 of the drain hole. Thus, the first end 26, the second end 28 with expanded diameter D7 positioned on either side of the drain hole 70, in conjunction with the main body 24 compressed in length and expanded diameter secures the through hole plug 10 in the drain hole 70.

FIG. 7 is a of the boat through-hole plug 10 of the present invention ready for insertion through the hull 76, 76' of a boat's drain hole 70.

Figure 8A:
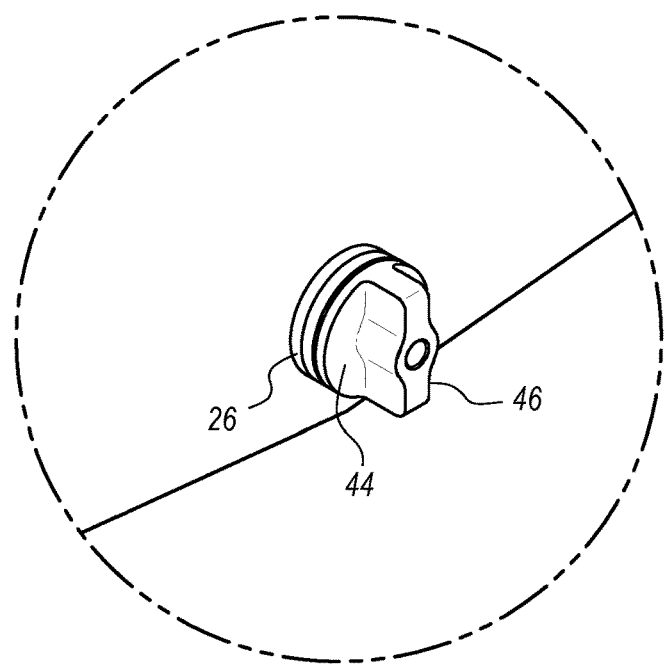
FIG. 8A is a perspective view of the boat through-hole plug of the present invention inserted through a drain hole of a boat.

FIG. 8A is a perspective view of the boat through-hole plug 10 of the present invention inserted through a drain hole 70 of a boat showing the first end 26 of the body 20 positioned on a first side of the hull 76 outside of the drain hole 70.

Figure 8B:
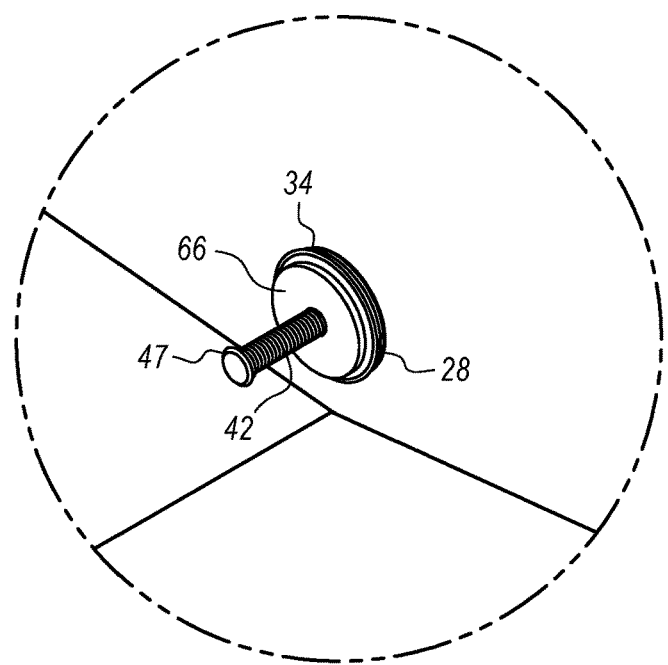
FIG. 8B is a perspective view of the boat through-hole plug of the present invention inserted through a drain hole of a boat.

FIG. 8B is a perspective view of the boat through-hole plug 10 of the present invention inserted through a drain hole 70 of a boat showing the second end 28 of the body 20 positioned on a second side of the hull 76' at a distance from the first side of the hull 76, on the opposite side of the drain hole.

Thus, while there has been shown and described, fundamental novel features of the disclosure as applied to various specific embodiments thereof, it will be understood that various omissions and substitutions and changes in the form and details of the apparatus illustrated, and in their operation, may be made by those skilled in the art without departing from the spirit of the disclosure. For example, it is expressly intended that all combinations of those elements which perform substantially the same function, in substantially the same way, to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore to be limited only as indicated by the scope of the claims appended hereto.

What is claimed is:

1. A through hole plug comprising:
a unitary body configured to fit within a drain hole, the unitary body including a first end, a second end, and a main body positioned therebetween, the unitary body further including a length that is greater than a length of the drain hole, such that the first end of the body extends beyond the drain hole on a first side of the drain hole and the second end of the body extends beyond the drain hole on a second side of the drain hole, wherein the second side of the drain hole is opposite to the first side of the drain hole, the first end of the unitary body further including a planar surface, wherein the planar surface of the first end includes a diameter that is larger than a diameter of the drain hole to prevent the first end from entering the drain hole, the first end further including a neck configured to transition with a rim positioned on the first side of the drain hole for mating engagement therewith, the body further comprising a corrugated surface formed of a plurality of annular ribs, wherein the plurality of annular ribs form concentric rings of substantially equal radii extending around a circumference of the body and along the length of the body, and wherein the body further comprises a bore of uniform diameter positioned in a center of the body, the bore extending continuously within the center of the body along the length of the body from the top end of the body to the bottom end of the body;
a bolt for insertion within the bore of the body, wherein the bolt includes a length that is greater than the length of the body, the bolt including a first end, wherein the first end of the bolt includes a handle for maneuvering the bolt in a clockwise or counter clockwise direction while inserted within the bore, the bolt further including a threaded portion, wherein a segment of the threaded bottom portion extends beyond the second end of the body; and
a flared nut with annular flange including a threaded aperture sized to receive and mate with the threaded portion of the bolt, wherein the annular flange includes a length, a conical tapered neck and a disk shaped plate, the conical tapered neck including a first end and a second end, wherein the first end of the conical tapered neck is configured to matingly engage with the bore of the body.

2. The through hole plug of claim 1, wherein the conical tapered neck comprises a progressively increasing diameter, such that a first end of the conical tapered neck most distal to the disk shaped plate includes a diameter that is substantially equal to the diameter of the bore and the second end of the conical tapered neck, most proximate to the disk shaped plate includes a diameter that exceeds the diameter of the bore, such that the first end of the conical tapered neck is inserted into the bore, while the second end of the conical tapered neck having a diameter that is greater than the diameter of the bore is not inserted into the bore.

3. The through-hole plug of claim 1, wherein the length of the bolt exceeds the sum of the length of the body and the length of the flared nut with annular flange.

4. The though-hole plug of claim 1, wherein when the threaded aperture of the annular flange is fastened to the threaded bottom portion of the bolt, the conical tapered neck is inserted into the bore and an end of the threaded bottom portion of the bolt is exposed and extends beyond the threaded aperture and disk shaped plate of the annular flange.

5. The through-hole plug of claim 1, wherein the body is a single unitary structure formed of a solid rigid rubber material.

6. The through-hole plug of claim 1, wherein a bottom portion of the neck includes a smooth slope for sealing engagement with a rim of the drain hole.

7. The through-hole plug of claim 1, wherein the body is cylindrical and tubular.

8. The through-hole plug of claim 1, wherein the handle of the bolt is an ergonomic bar positioned on a top portion of the bolt most distal to the bottom portion of the bolt.

9. The through-hole plug of claim 1, wherein the handle includes a substantially flat circular disk, wherein the disk includes a diameter equal to a diameter of the neck of the top end of the body such that when the bolt is inserted into the bore, the circular disk of the handle is aligned and flush with the first end of the body.

10. The through-hole plug of claim 1, wherein the bolt comprises a brass metal.

11. The through-hole plug of claim 1, wherein a washer is positioned between the top end of the body and a bottom side of a circular disk of the handle when the bolt is inserted into the bore.

12. The through-hole plug of claim 1, wherein the flared nut with annular flange is fastened to the threaded portion of the bolt and a second end of the bolt, most distal to the first end of the bolt is pinched to form a mushroom shape, wherein a diameter of the pinched second end is greater than a diameter of the threaded aperture of the flared nut with annular flange, such that the second end secures the flared nut with annular flange to the bolt.

13. The through-hole plug of claim 1, wherein the through-hole plug is inserted into a drain hole and the bolt is rotated to propel the conical neck of the flared nut with annular flange into the bore of the body.

14. The through-hole plug of claim 1, wherein the entire conical neck, including the first and second end of the conical neck of the flared nut with annular flange is forcibly propelled within the bore of the body.

15. The through-hole plug of claim 1, wherein the length of the body is compressed such that the main body within the drain hole pushes against interior walls of the drain, eliminating gaps between the through-hole plug and the drain hole, the through-hole plug thereby occupying the entirety of the drain hole, a bottom portion of the main body, and the second end of the body extending beyond the drain hole on the second side of the drain hole, are compressed in a lengthwise direction, such that a diameter of the bottom portion of the main body and the second end of the body increase, thereby exceeding a diameter of the second side of the drain hole and securing the through-hole plug on the first side of the drain hole, the second side of the drain hole and within the drain hole.

16. The through-hole plug of claim 15, wherein the diameter of the bottom portion of the main body and the second end of the body equal the diameter of the first end of the body.

17. A method of securing a through-hole plug into a drain hole of a boat, the method comprising:

providing a through hole plug having a unitary body configured to fit within a drain hole, the unitary body including a first end, a second end, and a main body positioned therebetween, the unitary body further including a length that is greater than a length of the drain hole, such that the first end of the body extends beyond the drain hole on a first side of the drain hole and the second end of the body extends beyond the drain hole on a second side of the drain hole, wherein the second side of the drain hole is opposite to the first side of the drain hole, the first end of the unitary body further including a planar surface, wherein the planar surface of the first end includes a diameter that is larger than a diameter of the drain hole to prevent the first end from entering the drain hole, the first end further including a neck configured to transition with a rim positioned on the first side of the drain hole for mating engagement therewith, the body further comprising a corrugated surface formed of a plurality of annular ribs, wherein the plurality of annular ribs form concentric rings of substantially equal radii extending around a circumference of the body and along the length of the body, and wherein the body further comprises a bore of uniform diameter positioned in a center of the body, the bore extending continuously within the center of the body along the length of the body from the top end of the body to the bottom end of the body;

providing a bolt for insertion within the bore of the body, wherein the bolt includes a length that is greater than the length of the body, the bolt including a first end, wherein the first end of the bolt includes a handle for maneuvering the bolt in a clockwise or counter clockwise direction while inserted within the bore, the bolt further including a threaded portion, wherein a segment of the threaded bottom portion extends beyond the second end of the body;

providing a flared nut with a conical tapered neck and annular flange including a threaded aperture sized to receive and mate with the threaded portion of the bolt;

inserting the through-hole plug into the boat's drain hole, such that the first end of the body extends beyond the drain hole on the first side of the drain hole and the second end of the body extends beyond the drain hole on the second side of the drain hole opposite to the first side of the drain hole; and fastening the threaded portion of the bolt to the flared nut, such that a first end of the conical tapered neck is inserted into the bore.

18. The method of claim 17, further comprising: applying a force to fasten the threaded portion of the bolt to the flared nut with annular flange; the force of fastening the threaded portion of the bolt to the flared nut with annular flange thereby propelling the conical tapered neck into the bore, such that a diameter of the main body expands within the drain hole and a diameter of the second end of the body extending beyond the drain hole expands beyond the diameter of the drain hole of the boat, thereby securing the main body of the through-hole plug within the drain hole.

* * * * *